United States Patent Office 3,471,468
Patented Oct. 7, 1969

3,471,468
DISPERSE AZO DYESTUFFS
Werner Bossard, Riehen, Francois Favre, Basel, Hans E. Wegmuller, Riehen, and Jacques Voltz, Basel, Switzerland, assignors to J. R. Geigy A.-G., Basel, Switzerland
No Drawing. Continuation of application Ser. No. 300,627, Aug. 7, 1963. This application Apr. 10, 1967, Ser. No. 629,831
Claims priority, application Switzerland, Aug. 2, 1962, 9,259/62; July 19, 1963, 9,049/63
Int. Cl. C09b 29/22, 29/36, 29/38
U.S. Cl. 260—163      5 Claims

ABSTRACT OF THE DISCLOSURE

Dyestuffs of the formula

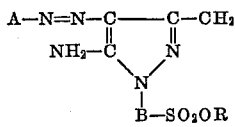

wherein A is a nitrophenyl group and R is primary or secondary alkyl with 4 to 10 carbon atoms, cyclohexyl, phenyl or pyridyl-(3), are useful as disperse dyes for dyeing a variety of textile fibers, and especially polyglycol terephthalate fibers, in aqueous dispersion.

---

This application is a continuation of copending application, Ser. No. 300,627, filed Aug. 7, 1963, and now abandoned, as a continuation-in-part of our copending application Ser. No. 296,503, filed July 22, 1963 (now abandoned).

The present application concerns new, water dispersible azo dyestuffs, processes for the production thereof, processes for the dyeing of organic hydrophobic materials using the new dyestuffs and, as industrial products, the materials dyed with the aid of these dyestuffs.

Dyeings of organic hydrophobic fibrous materials such as high molecular esters of aromatic polycarboxylic acids with polyfunctional alcohols, synthetic polyamide fibers and the like with the known disperse dyes are frequently not sufficiently fast; in particular, they often lack sufficient light fastness and fastness to sublimation, and the known disperse dyes lack drawing power on these materials.

It has now been found that compounds falling under the formula

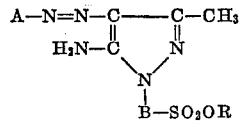      (I)

wherein A represents the radical of the formula

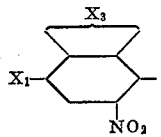

and a radical of the formula

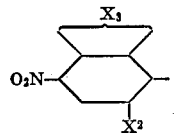

wherein $X_1$ represents hydrogen, chlorine, bromine, nitro, lower alkylsulfonyl, lower alkyl or lower alkoxy, $X_2$ represents hydrogen, chlorine, bromine, lower alkyl, lower alkoxy or cyano, $X_3$ represents hydrogen, chlorine, bromine or lower alkoxycarbonyl, B represents phenyl, lower alkylphenyl or chlorophenyl, and R represents primary or secondary alkyl with from 4 to 10 carbon atoms, cyclohexyl, phenyl, lower alkylphenyl, lower alkoxyphenyl, chlorophenyl, bromophenyl, lower alkanoylaminophenyl, hydroxy-lower alkylphenyl, carbamylphenyl, sulfamylphenyl, N-lower alkyl-carbamylphenyl, N-lower alkyl-sulfamylphenyl, lower alkoxy carbonylphenyl, diphenyl, di-(N-lower alkyl)-aminophenyl, phenoxyphenyl, naphthyl or pyridyl-3-and wherein the substituent —$SO_2$—OR is bonded directly to the benzene nucleus of B in Formula I, and which compounds of Formula I are free from water solubilizing groups which dissociate acid in water, are highly useful as disperse dyestuffs for the dyeing of organic, hydrophobic, synthetic textile fibers from aqueous dispersion, for example, for the dyeing of cellulose di- or tri-acetate, particularly however for the dyeing of high molecular esters of aromatic polycarboxylic acids with polyfunctional alcohols, for example, of polyglycol terephthalates such as Terylene, Dacron, Tergal, Trevira, as well as of other polymers such as Kodel. The dyestuffs can also be used, however, for the dyeing of synthetic polyamide fibers such as nylon 6 or nylon 66, which dyeings are distinguished by their good fastness properties, among them fastness to washing (alkali, water, sea water, etc.) and to light and sublimation.

Moreover, light fast dyeings are obtained with the dyestuffs according to the invention on polyacrylonitrile fibers such as, e.g. Orlon.

Dyestuffs of Formula I are also suited for use in dyeing acetate rayon, polyester fibers, polyamide fibers such as nylon and the like, in the mass, prior to spinning (dope dyeing) and also as pigments in lacquers and paints, because of their good solubility in organic solvents such as acetone, chloroform and the like.

Polyester fibers are preferably dyed with aqueous dispersions of the dyestuffs according to the invention at temperatures of over 100° C. under pressure. Dyeing can also be performed, however, at the boiling point of the dyebath in the presence of so-called carriers such as, e.g. phenyl-phenol, polychlorobenzene compounds or similar auxiliaries, or by the foulard process after which the dyeing is thermofixed at 180–210° C.

The drawing power of the dyestuffs can be further improved by mixing two or more of the monoazo dyestuffs according to the invention.

Dyestuffs according to the invention are distinguished by their good affinity to hydrophobic polyester fibers, particularly to polyglycol terephthalates and, depending on their composition, produce on these fibers yellow to orange dyeings of good colour strength which have very good fastness to washing, sublimation, light, perspiration and cross-dying. In addition, vegetable and animal fibers, particularly cotton, are very well reserved by the dyestuffs according to the invention. They can also be dyed evenly with the usual commercial carriers.

Dyeings on the above-described hydrophobic fibers which have optimal drawing power, fastness to light and sublimation are obtained with those disperse dyestuffs according to the invention which fall under the formula

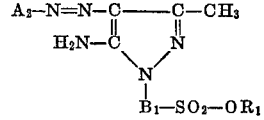      (II)

wherein $A_2$ is a radical of the formula

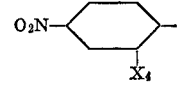

$X_4$ being chlorine, bromine, nitro or cyano, and wherein $B_1$ is a radical of the formula

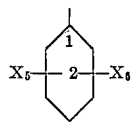

wherein each of $X_5$ and $X_6$ is, independently of the other, hydrogen, chlorine, bromine, or methyl, preferably in 2- and/or 6 position and to which the substituent —$SO_2$—OR, is linked directly either in 3- or 4-position.

The term "lower" used herein in connection with an aliphatic radical means that said radical has from 2 to maximally 4 carbon atoms.

The novel dystuffs according to the invention are produced by coupling the diazonium compound of an amine of formula $$A-NH_2 \quad (III)$$

with a coupling component of the formula

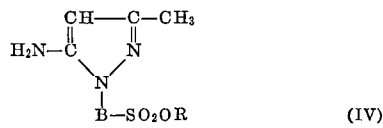

(IV)

Neither the diazo compound nor the coupling component may contain any substituents which dissociate acid in water, such as —$SO_3H$ or —COOH.

In the above Formulas III and IV, A, B and R have the meanings given above.

In the substituent —$SO_2OR$, the radical —OR is, for example, an alkoxy group which is derived from n- or sec. butanol, from an n- or sec. amyl or hexyl alcohol, or it is a cycloalkoxy group, e.g., the cyclohexyloxy group, or an unsubstituted aryloxy group, or a substituted aryloxy group which is derived, e.g. from a hydroxynaphthalene such as 1- or 2-hydroxy-napthalene, or preferably, from a monohydroxy-benzene such as phenol or phenol substituted by lower alkyl, lower alkoxy, hydroxy-lower alkyl, aryloxy, especially phenyloxy, acylamino, especially lower alkanoylamino or benzoylamino, tert.-tri-lower alkyl amino, carbamyl, sulphamyl, N-mono- or N-di-substituted carbamyl groups, carboxylic acid ester radicals, particularly lower alkoxy carbonyl groups or by halogen, for example, 2-, 3- or 4-methyl- or 2-, 3- or 4-ethyl- 1-hydroxybenzene or technical mixtures thereof 2-hydroxymethyl-1-hydroxybenzene, 3,4- or 2,4-dimethyl-, 4-sec. butyl-, 5-isooctyl-, 2-, 3- or 4-chloro-, 2,4-dichloro-, 2-, 3- or 4-bromo-, 2-, 3- or 4-methoxy-, 2-, 3- or 4- ethoxy-, 4-phenoxy-, 2- or 4-phenyl-, 3-dimethylamino-, 3-diethylamino-, 2-, 3- or 4-methoxycarbonyl- or 2-, 3- or 4-ethoxycarbonyl-1-hydroxybenzene, 2-, 3- or 4-acetylamino-1-hydroxybenzene, 3- or 4-carbamoyl-1-hydroxybenzene, 3- or 4-sulfamoyl-1-hydroxybenzene or 3- or 4-N-methylcarbamoyl-1-hydroxybenzene, 3- or 4-N-methyl-sulfamoyl-1-hydroxybenzene or 3- or 4-N-dimethyl-carbamoyl-1-hydroxybenzene or 3- or 4-N-di-methyl-sulfamoyl-1-hydroxybenzene.

When the diazo components of Formula III used according to the invention contain the characteristic —$SO_2OR$ group, these are, for example, esters of the alcohols, naphthols and, particularly, phenols mentioned above with regard to the radical —OR, which are derived from 1-aminobenzene-2-, -3- or -4-sulphonic acid, 2-nitro-1-aminobenzene-4-sulphonic acid or 4-nitro-1-aminobenzene-2-sulphonic acid.

Coupling components of Formula IV having the —$SO_2OR$ group as defined which are particularly suitable as reactants according to the invention are esters of the hydroxyl compounds mentioned above which are derived from, e.g., 1-phenyl-3-methyl-5-aminopyrazole-2′-, -3′- or -4′-sulfonic acid, 1-(4′-methylphenyl)-3-methyl-5-amino-pyrazole-2′-sulfonic acid, 1-(2′-chlorophenyl)-3-methyl-5-amino-pyrazole-5′-sulfonic acid or 1-(2′,5′-dichlorophenyl)-3-methyl-5-aminopyrazole-4′-sulfonic acid.

Amines of Formula III containing sulfonic acid ester groups are obtained, for example, by reacting the desired alcohol, naphthol or phenol with the corresponding nitrobenzene sulphonic acid chloride or bromide and then reducing the nitro to the amino group, or by reacting the alcohols, naphthols or phenols with the corresponding halogen-nitrobenzene-sulphonic acid chloride or bromide and then reacting the halogen-nitrobenzene-sulphonic acid ester with ammonia.

Aminopyrazoles containing sulphonic acid ester groups of Formula IV are obtained, for example by esterifying the corresponding nitrobenzene sulphonic acid chlorides with alcohols, naphthols or phenols, reducing the nitro group to the amino group, converting the aminobenzene sulphonic acid esters into the corresponding hydrazinobenzene sulphonic acid esters and condensing the latter with acetyl-acetonitrile.

Examples of amines of Formula III which are suited in the process for making the compounds according to the invention, and which do not contain the characteristic —$SO_2OR$ group, are 1-amino-2-nitro-4-chloro-benzene, -4-fluoro-benzene or -4-bromo-benzene, 1-amino-2-nitro-4-trifluoro-methyl-benzene, 1-amino-2- or 4-nitro benzene, 1-amino-4-nitro-2-chloro-benzene or -2-bromo benzene, 1-amino - 4 - nitro-2-cyanobenzene, 1-amino-4-nitro-2,5-dichloro-benzene, or -2,5-dibromo-benzene, or -2,6-dichlorobenzene or 2,6-dibromobenzene, 1-amino-2,4-dinitrobenzene, 1-amino-2,4-dinitro-6-chlorobenzene or -6-bromobenzene, 1-amino-2,4-, -2,5- or -3,4-dicyanobenzene, 1-amino - 2 - nitro-4-methylsulphonyl-benzene, -4-ethylsulphonyl-benzene or -4-phenylsulphonyl-benzene, 1-amino-2-nitro-4-sulphamyl-benzene, 4-N,N-dimethyl-sulphonylbenzene, or 4-N-cyclohexyl-sulphonyl benzene, 1-amino-4-nitro-2-benzoic acid ethyl ester.

Examples of coupling components of Formula IV without the characteristic —$SO_2OR$ group are 1-phenyl-, 1-(2′-, 3′- or 4′-methylphenyl)-, 1-(2′-, 3′- or 4′-methoxy phenyl)-, 1-(2′- or 4′-chlorophenyl)-, 1-(2′,4′-dichlorophenyl)-, 1-(3′- or 4′-acetylaminophenyl)- 3-methyl-5-amino-pyrazole, 1-ethyl-, 1-propyl-, 1-isopropyl, 1-β-hydroxyethyl-, 1-(β-cyanoethyl-, 1-γ-methoxypropyl-, 1-cyclohexyl- or 1-benzyl-) 3-methyl-5-aminopyrazole.

The coupling is performed in mineral acid or, preferably, in weakly acid solution, advantageously while gradually buffering the acid with, for example, alkali metal salts of carbonic acid or low fatty acids. If desired, a suitable diazonium compound can also be coupled with a mixture of two or more coupling components usuable according to the invention simultaneously.

A modification of the process for the production of the new azo dyestuffs consists in condensing an azo compound of formula

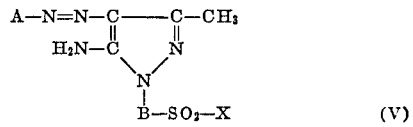

(V)

wherein A and B have meanings given above,

X represents chlorine or bromine, and in which the —$SO_2X$ group is isocyclically and aromatically bound, with an organic hydroxyl compound of formula $$R-OH \quad (VI)$$

wherein R has the meaning given above, to form a compound of Formula I, the components being so chosen that the dystuff does not contain any water solubilizing groups which dissociate acid in water.

Naturally, the remarks regarding A, B and $SO_2OR$ made in the description, supra, of the first process are also pertinent here.

Starting materials of Formual V are obtained, for example, by coupling the diazonium compound of an amine of Formula III with an azo component of Formula IV, one of which components contains a sulfonic acid group, bonded directly to an aromatic carbocyclic nucleus and converting the azo dyestuff sulfonic acid so obtained to the corresponding sulfonic acid chloride or bromide, for example, with a phosphorus halide or with thionyl chloride, without, or in the presence of, a tertiary nitrogen base and an inert solvent or diluent. Examples of suitable amines of Formula III and of coupling components of Formula IV are the 1-aminobenzenes or the optionally substituted 3-methyl-5-aminopyrazoles or the sulphonic acid of these compounds respectively mentioned in the first process, as well as 2-nitro-1-amino-benzene-4-sulfonic acid, 4-nitro-1-amino-benzene-2-sulfonic acid, 5-chloro-2-nitro-1-amino-benzene-4-sulfonic acid.

Examples of organic hydroxyl compounds of Formula VI which are to be reacted with the sulphonic acid chlorides or bromides of Formula V are those mentioned in the illustration of —OR.

The condensation of compounds of Formula V with the hydroxyl compounds of Formula VI to form esters of Formula I is performed advantageously at a raised temperature, preferably either in aqueous, organic or aqueous/organic solution. Suitable solvents therefore are: those miscible with water, e.g. low aliphatic alcohols such as methanol or ethanol, low aliphatic ketones such as acetone or methylethyl ketone, or ether alcohols such as ethylene glycol, monomethyl or monoethyl ether, or those non-miscible with water, e.g. optionally halogenated aromatic hydrocarbons such as benzene, toluene, xylenes, chlorobenzene or dichlorobenzenes.

The hydroxyl compounds to be reacted such as hydroxyalkyl, hydroxycycloalkyl or hydroxyaryl compounds are advantageously used in the form of their metal salts such as the sodium or potassium salts.

The dyestuffs according to the invention are brought into a finely distributed form by milling with dispersing agents. Suitable dispersing agents are, e.g. anionic dispersing agents such as alkylarylsulphonates, condensation products of formaldehyde and naphthalene sulphonic acids, lignin sulphonates, or non-ionogenic dispersing agents such as fatty alcohol polyglycol ethers. Advantageously mixtures of the anionic and non-ionogenic dispersing agents mentioned are used.

The following non-limitative examples illustrate the invention. Where not otherwise expressly stated, parts and percentages are by weight. The temperatures are in degrees centigrade. The relationship of parts by weight to parts by volume is as that of grams to cubic centimeters.

Example 1

18.3 parts of 1-amino-2,4-dinitrobenzene in 35 parts of concentrated sulphuric acid are diazotised for 12 hours at 15° with an amount of nitrosyl sulphuric acid equivalent to 6.9 parts of sodium nitrite. The diazo solution is diluted with ice and then added dropwise at 5° to a slurry of 34.3 parts of 1-phenyl-3-methyl-5-aminopyrazole-3'-sulphonic acid-(4''-methylphenyl)-ester in 100 parts of dimethylformamide, 300 parts of water, 120 parts of crystallised sodium acetate, 1000 parts of ice and 5 parts of a condensation product of oleyl alcohol with 20 moles of ethylene oxide.

The dyestuff formed is filtered off under suction, washed neutral and dried in vacuo at 60°. It is obtained in the form of an orange coloured powder; its composition corresponds to the formula

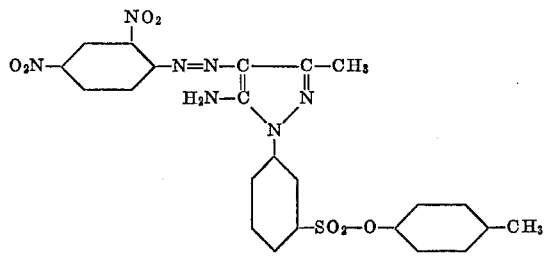

When milled with dodecyl benzene sulphonate, it dyes polyester fibers such as Dacron from aqueous dispersion, possibly in the presence of o-phenylphenol, in vivid orange shades. The dyeings have excellent fastness to washing, sublimation and light.

If, instead of the 34.5 parts of 1-phenyl-3-methyl-5-aminopyrazole-3'-sulphonic acid-(4''-methylphenyl)-ester, a corresponding amount of the coupling components given in Table I is used and otherwise the procedure given in the example is followed, then dyestuffs which produce dyeings on polyterephthalic acid glycol ester fibres having similarly good properties are attained.

The 1 - phenyl - 3-methyl-5-aminopyrazole-3'-sulphonic acid (4''-methylphenyl)-ester used for the coupling is obtained, for example, by reacting 3-nitrobenzene sulphonic acid chloride with 4-methyl-1-hydroxybenzene, reducing the nitro to the amino group, converting the 3-aminobenzene 1-sulphonic acid-4'-methylphenyl ester into the corresponding hydrazino compound, and condensing the latter with acetylacetonitrile

TABLE I

| Number | Diazo component | Coupling component | Shade on polyester fibres |
| --- | --- | --- | --- |
| 1 | 1-amino-2,4-dinitrobenzene | 1-phenyl-3-methyl-5-aminopyrazole-3'-sulphonic acid-(2''-chlorophenyl)-ester (36.4 parts). | Orange. |
| 2 | do | 1-phenyl-3-methyl-5-aminopyrazole-3'-sulphonic acid-(4''-chlorophenyl)-ester (36.4 parts). | Do. |
| 3 | do | 1-phenyl-3-methyl-5-aminopyrazole-3'-sulphonic acid-(2'',4''-dichlorophenyl)-ester (39.8 parts). | Do. |
| 4 | do | 1-phenyl-3-methyl-5-aminopyrazole-3'-sulphonic acid-(3''-methoxyphenyl)-ester (35.9 parts). | Do. |
| 5 | do | 1-phenyl-3-methyl-5-aminopyrazole-3'-sulphonic acid-(2''-methylphenyl)-ester (34.3 parts). | Do. |
| 6 | do | 1-phenyl-3-methyl-5-aminopyrazole-3'-sulphonic acid-(4''-methylphenyl)-ester (34.3 parts). | Do. |
| 7 | do | 1-phenyl-3-methyl-5-aminopyrazole-3'-sulphonic acid-(4''-tert.butylphenyl)-ester (38.7 parts). | Do. |
| 8 | do | 1-phenyl-3-methyl-5-aminopyrazole-3'-sulphonic acid-(4''-phenoxyphenyl)-ester (42.1 parts). | Do. |
| 9 | do | 1-phenyl-3-methyl-5-aminopyrazole-3'-sulphonic acid-(4''-carboethoxyphenyl)-ester (40.1 parts). | Do. |

Example 2

17.3 parts of 1-amino-4-nitro-2-chlorobenzene in 30 parts of concentrated hydrochloric acid and 180 parts of water are diazotised in the usual way at 0–5° with 6.9 parts of sodium nitrite in 100 parts of water. The solution of the diazonium compound is added dropwise at 5° to a slurry of 32.9 parts of 1-phenyl-3-methyl-5-aminopyrazole-4'-sulphonic acid phenyl ester in a mixture of 100 parts of dimethyl formamide, 1500 parts of water, 120 parts of crystallised sodium acetate and 5 parts of a fatty acid-polyethylene oxide condensation product. The corresponding yellow orange dyestuff is filtered off under suction, washed neutral with water and dried in vacuo at 60°–70°.

The dyestuff obtained corresponds to the formula

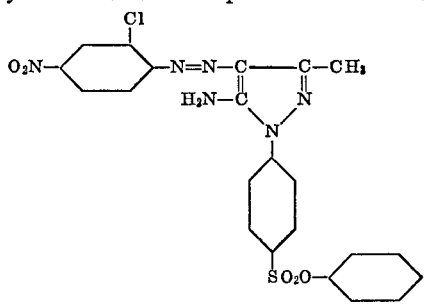

After milling with a condensation product of naphthalene sulphonic acids and formaldehyde, the dyestuff dyes polyglycol terephthalate fibres such as Dacron, possibly in the presence of o-phenylphenol, in pure yellow shades. The dyeings have very good fastness to washing, light and sublimation.

The 1 - phenyl-3-methyl-5-aminopyrazole-4'-sulphonic acid phenyl ester used as starting material is obtained by condensation of 4-nitrobenzene sulphonic acid chloride with phenol, reducing the nitro to the amino group, converting the 4-aminobenzene sulphonic acid phenylester into the corresponding hydrazino compound and condensing the latter with acetylacetonitrile.

Dyestuffs having similar good properties are obtained if, instead of the 32.9 parts of 1-phenyl-3-methyl-5-aminopyrazole-4'-sulphonic acid phenyl ester, the equivalent amount of 1 - phenyl - 3 - methyl-5-aminopyrazole-4'-sulphonic acid-(2''-methylphenyl)-ester, 1-phenyl-3-methyl-5 - aminopyrazole - 4'-sulphonic acid-(3''-methylphenyl)-ester, 1 - phenyl - 3-methyl-5-aminopyrazole-4'-sulphonic acid - (4'' - methylphenyl) - ester or 1-phenyl-3-methyl-5-aminopyrazole-4'-sulphonic acid-(4''-chlorophenyl)-ester is used.

Example 3

Nitrosyl sulphuric acid, corresponding to 6.9 parts of sodium nitrite, is added at 10–15° dropwise to a solution of 16.3 parts of 1-amino-4-nitro-2-cyanobenzene in 100 parts of concentrated sulphuric acid and the whole is left to diazotise for 3 hours at room temperature. The diazonium salt solution so obtained is added dropwise to a slurry of 36.4 parts of 1-(2'-chlorophenyl)-3-methyl-5-aminopyrazole-5'-sulphonic acid - (2'''-methylphenyl)-ester and 120 parts of crystallised sodium acetate, 1000 parts of ice, 100 parts of dimethyl formamide, and 5 parts of fatty alcohol-polyethylene oxide condensation product. On completion of the coupling, the precipitate formed is filtered off, washed neutral with water and dried in vacuo at 60°. The dyestuff is an orange coloured powder which corresponds to the formula

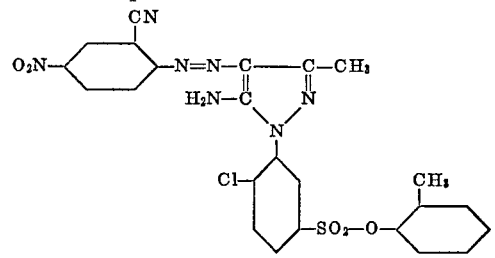

When milled with a condensation product of naphthalene sulphonic acid and formaldehyde, the dyestuff so obtained dyes polyglycol terephthalate fibres such as Dacron in vivid orange shades from aqueous dispersion, possibly in the presence of a carrier such as o-phenylphenol. The dyebath is substantially exhausted, and the dyeings have excellent fastness to washing, sublimation and light.

The 1-phenyl-3-methyl-5-aminopyrazole-3' - sulphonic acid-(2''-methylphenyl)-ester used for the coupling is obtained for example, as described in Example 1 starting from 3-nitrobenzene-sulphonic acid chloride and 2-methyl-1-hydroxybenzene.

If, in the above example, instead of the 34.3 parts of 1 - phenyl - 3 - methyl - 5 - aminopyrazole - 3' - sulphonic acid-(2''-methylphenyl)-ester, a corresponding amount of the coupling components given in Table I is used and they are coupled under the conditions described in the above example, then dyestuffs are obtained which produce dyeings on polyester fibres having similar good properties.

TABLE II

| Number | Diazo component | Coupling component | Shade on polyester fibres |
|---|---|---|---|
| 1 | 1-amino-4-nitrobenzene | 1-phenyl-3-methyl-5-aminopyrazole-3'-sulphonic acid phenyl ester | Orange. |
| 2 | do | 1-phenyl-3-methyl-5-aminopyrazole-3'-sulphonic acid-(4''-methylphenyl)-ester | Do. |
| 3 | do | 1-phenyl-3-methyl-5-aminopyrazole-4'-sulphonic acid phenyl ester | Do. |
| 4 | do | 1-phenyl-3-methyl-5-aminopyrazole-4'-sulphonic acid (4''-chlorophenyl)-ester | Do. |
| 5 | do | 1-phenyl-3-methyl-5-aminopyrazole-4'-sulphonic acid:-(3''-methoxyphenyl)-ester | Do. |
| 6 | do | 1-(2'-chlorophenyl)-3-methyl-5-aminopyrazole-5-sulphonic acid phenyl ester | Yellow-orange. |
| 7 | do | 1-(2'-chlorophenyl)-3-methyl-5-aminopyrazole-5'-sulphonic acid-(4''-methylphenyl)-ester | Yellow. |
| 8 | 1-amino-4-nitro-2-cyanobenzene. | 1-phenyl-3-methyl-5-aminopyrazole-3'-sulphonic acid phenyl ester | Yellow-orange. |
| 9 | do | 1-phenyl-3-methyl-5-aminopyrazole-4'-sulphonic acid phenyl ester | Do. |
| 10 | do | 1-(2'-chlorophenyl)-3-methyl-5-aminopyrazole-5'-sulphonic acid phenyl ester | Do. |
| 11 | do | 1-(2',5'-dichlorophenyl)-3-methyl-5-aminopyrazole-4'-sulphonic acid phenyl ester | Do. |
| 12 | do | 1-phenyl-3-methyl-5-aminopyrazole-3'-sulphonic acid-(4''-chlorophenyl)-ester | Do. |
| 13 | do | 1-phenyl-3-methyl-5-aminopyrazole-3'-sulphonic acid-(2''-methylphenyl)-ester | Do. |
| 14 | do | 1-phenyl-3-methyl-5-aminopyrazole-3'-sulphonic acid-(4''-methylphenyl)-ester | Do. |
| 15 | do | 1-phenyl-3-methyl-5-aminopyrazole-4'-sulphonic acid-(3''-methylphenyl)-ester | Do. |
| 16 | do | 1-(2'-chlorophenyl)-3-methyl-5-aminopyrazole-5'-sulphonic acid-(3''-methoxyphenyl)-ester | Do. |
| 17 | 1-amino-4-nitro-2-bromobenzene. | 1-phenyl-3-methyl-5-aminopyrazole-3'-sulphonic acid phenyl ester | Yellow-orange. |
| 18 | do | 1-phenyl-3-methyl-5-aminopyrazole-4'-sulphonic acid phenyl ester | Do. |
| 19 | do | 1-(2',5'-dichlorophenyl)-3-methyl-5-aminopyrazole-4'-sulphonic acid phenyl estr. | Do. |
| 20 | do | 1-(2'-chlorophenyl)-3-methyl-5-aminopyrazole-5'-sulphonic acid-(3''-methoxyphenyl)-ester | Do. |
| 21 | do | 1-(2'-chlorophenyl)-3-methyl-5-aminopyrazole-5'-sulphonic acid-(2''-methylphenyl)-ester | Do. |
| 22 | do | 1-(2-chlorophenyl)-3-methyl-5-aminopyrazole-5'-sulphonic acid-(4-''chlorophenyl)-ester | Do. |

Example 4

20.7 parts of 1-amino-4-nitro-2,6-dichlorobenzene in 40 parts of concentrated sulphuric acid are diazotised with nitrosyl sulphuric acid, corresponding to 6.9 parts of sodium nitrite, with 2 hours at 20–25°. The diazonium salt solution is poured into a cooled solution of 25.3 parts of 1-phenyl-3-methyl-5-aminopyrazole-3'-sulphonic acid in 1000 parts of water, 150 parts of sodium acetate and 1 part of a condensation product of naphthalene sulphonic acid and formaldehyde. The dried dyestuff so obtained is converted into the sulphochloride with 20 parts of phosphorus oxychloride in 200 parts of chlorobenzene in the presence of 5 parts of pyridine.

7 parts of this dyestuff acid chloride, 4 parts of 4-methyl-1-hydroxybenzene and 14 parts of sodium carbonate are boiled, while stirring vigorously, in a mixture of 100 parts of water and 30 parts of ethyl alcohol for 16 hours. After cooling the reaction mixture to room temperature, the yellow dyestuff is filtered off, washed with a great deal of water and dried in vacuo at 60–70°. The product so obtained has the formula

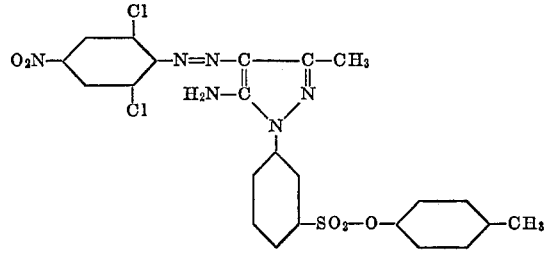

Dyestuffs having similar properties are obtained if equivalent amounts of the sulphonic acid chlorides given in column 2 of the following Table III are coupled under the conditions described in the above example with corresponding amounts of the hydroxyaryl compounds given in column 3.

TABLE III

| No. | Sulphonic acid chloride | Hydroxyaryl compound | Shade on polyester fibre |
|---|---|---|---|
| 1 | ![structure with Cl, O2N, N=N-C-C-CH3, H2N-C, Cl, N, phenyl-SO2Cl] | Hydroxybenzene | Orange. |
| 2 | Same as No. 1 above | 2-methoxy-1-hydroxybenzene | Do. |
| 3 | do | 3-methyl-1-hydroxybenzene | Do. |
| 4 | do | 4-methyl-1-hydroxybenzene | Do. |
| 5 | do | 2-chloro-1-hydroxybenzene | Do. |
| 6 | do | 3-chloro-1-hydroxybenzene | Do. |
| 7 | do | 4-chloro-1-hydroxybenzene | Do. |
| 8 | do | 3-methoxy-1-hydroxybenzene | Do. |
| 9 | do | 4-tert. butyl-1-hydroxybenzene | Do. |
| 10 | ![structure with Cl, O2N, N=N-C-C-CH3, H2N-C, Cl, N, Cl-phenyl-SO2Cl] | Hydroxybenzene | Yellow-orange. |
| 11 | Same as No. 10 above | 4-methyl-1-hydroxybenzene | Do. |
| 12 | do | 4-chloro-1-hydroxybenzene | Do. |
| 13 | do | 2,4-dichloro-1-hydroxybenzene | Do. |
| 14 | do | 4-phenyl-1-hydroxybenzene | Do. |
| 15 | do | 3-dimethylamino-1-hydroxybenzene | Do. |
| 16 | ![structure with Cl, O2N, N=N-C-C-CH3, H2N-C, NO2, N, phenyl-SO2Cl] | Hydroxybenzene | Orange. |
| 17 | Same as No. 16 above | 3-methyl-1-hydroxybenzene | Do. |
| 18 | do | 3-methoxy-1-hydroxybenzene | Do. |
| 19 | do | 2-chloro-1-hydroxybenzene | Do. |
| 20 | do | 3-chloro-1-hydroxybenzene | Do. |
| 21 | do | 2-bromo-1-hydroxybenzene | Do. |

Example 5

23 parts of 1-amino-2-nitro-4-methylsulphonylbenzene are dissolved in 60 parts of concentrated sulphuric acid and the solution is diazotised for 6 hours at 15° with nitrosyl sulphuric acid, corresponding to 6.9 parts of sodium nitrite. The diazonium salt solution so obtained is added dropwise at 8–10° to a solution of 24.1 parts of 1 - phenyl - 3 - methyl-5-aminopyrazole-3'-sulphonic acid in 850 parts of water, 10 parts of sodium hydroxide and 135 parts of crystallised sodium acetate. The dyestuff so obtained is dried and then converted into the corresponding sulphochloride with 24 parts of phosphorus oxychloride in 280 parts of chlorobenzene and 2.5 parts of triethylamine.

4.85 parts of this dyestuff sulphochloride, 2.5 parts of 2-methyl-1-hydroxybenzene and 12 parts of sodium carbonate are boiled for 12 hours in 100 parts of water and 80 parts of ethyl alcohol. After cooling to room temperature, the orange dyestuff is filtered off, washed with water and dried in vacuo at 70°.

The product so obtained corresponds to the formula

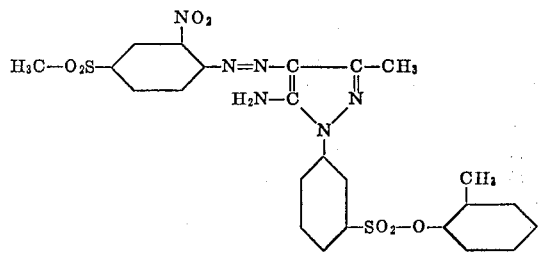

After milling with a condensation product of naphthalene sulphonic acid and formaldehyde, the dyestuff dyes polyglycol terephthalate fibres such as Dacron in orange shades, possibly in the presence of o-phenylphenol. The dyeings have excellent fastness to washing, light and sublimation.

Dyestuffs having similarly good properties are obtained under the same condensation conditions if the sulphochlorides given in column 2 of the following Table IV are reacted with corresponding amounts of the hydroxyaryl compounds given in column 3.

TABLE IV

| No. | Sulphonic acid chloride | Hydroxyaryl compound | Shade on polyester fibres |
|---|---|---|---|
| 1 | H₃CO₂S–⟨NO₂⟩–N=N–C(H₂N–C)–C–CH₃ (pyrazole, N-phenyl-SOCl₂) | Hydroxybenzene | Orange. |
| 2 | Same as No. 1 above | 3-methyl-1-hydroxybenzene | Do. |
| 3 | do | 4-methyl-1-hydroxybenzene | Do. |
| 4 | do | 3-methoxy-1-hydroxybenzene | Do. |
| 5 | do | 4-n-butyl-1-hydroxybenzene | Do. |
| 6 | do | 2-chloro-1-hydroxybenzene | Do. |
| 7 | do | 3-chloro-1-hydroxybenzene | Do. |
| 8 | H₅C₂O₂S–⟨NO₂⟩–N=N–C(H₂N–C)–C–CH₃ (pyrazole, N-phenyl-SO₂Cl) | 3-methyl-1-hydroxybenzene | Do. |
| 9 | Same as No. 8 above | Hydroxybenzene | Do. |
| 10 | do | 2-methyl-1-hydroxybenzene | Do. |
| 11 | do | 2-chloro-1-hydroxybenzene | Do. |
| 12 | do | 3-chloro-1-hydroxybenzene | Do. |
| 13 | do | 4-chloro-1-hydroxybenzene | Do. |
| 14 | do | 3-methoxy-1-hydroxybenzene | Do. |
| 15 | ⟨⟩–O₂S–⟨NO₂⟩–N=N–C(H₂N–C)–C–CH₃ (pyrazole, N-phenyl-SO₂Cl) | Hydroxybenzene | Do. |

TABLE IV—Continued

| No. | Sulphonic acid chloride | Hydroxyaryl compound | Shade on polyester fibres |
|---|---|---|---|
| 16 | (structure) | 4-methyl-1-hydroxybenzene | Do. |
| 17 | (structure) | 4-chloro-1-hydroxybenzene | Do. |
| 18 | (structure) | 2-methyl-1-hydroxybenzene | Do. |
| 19 | (structure) | Hydroxybenzene | Do. |
| 20 | (structure) | 4-methyl-1-hydroxybenzene | Do. |

Example 6

17.3 parts of 1-amino-2-nitrobenzene-4-sulphonic acid in 500 parts of water, 30 parts of hydrochloric acid and 6.9 parts of sodium nitrate are diazotized at 0–5° and the diazonium solution is coupled at 5–7° with 16.1 parts of 1-phenyl-3-methyl-5-aminopyrazole in 300 parts of glacial acetic acid and 300 parts of water. The dyestuff obtained is dried and then converted into the corresponding sulphochloride with 20 parts of phosphorus oxychloride in 200 parts of tetrachloroethane in the presence of 5 parts of pyridine.

4 parts of this dyestuff sulphochloride, 2.5 parts of 4-methyl-1-hydroxybenzene and 10 parts of sodium carbonate are boiled while stirring for 12 hours in a mixture of 100 parts of water and 40 parts of ethyl alcohol. After cooling to room temperature, the yellow dyestuff is filtered off, washed with cold water and dried in vacuo at 70°. The product so obtained has the formula

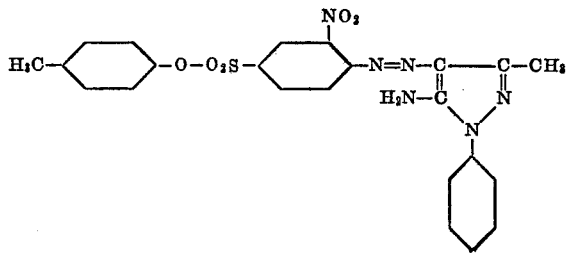

The dyestuff is milled with a mixture of lignin sulphonate and the sodium salt of a naphthalene sulphonic acid/formaldehyde condensation product. Polyglycol terephthalate fibres or cellulose triacetate fibres can be dyed in pure yellow-orange shades with the dye preparation so obtained, if necessary, in the presence of carriers such as o-phenylphenol. The dyeings have very good fastness to light and sublimation.

Dyestuffs with the same good properties are obtained under the same condensation conditions if the sulphonic acid chlorides given in column 2 of the following Table V are coupled with corresponding amounts of the hydroxyaryl compounds given in column 3.

TABLE V

| No. | Sulphonic acid chlorides | Hydroxyaryl compound | Shade on polyester fibres |
|---|---|---|---|
| 1 | [structure] | Hydroxybenzene | Orange. |
| 2 | Same as No. 1 above | 2-methyl-1-hydroxybenzene | Do. |
| 3 | do | 3-methyl-1-hydroxybenzene | Do. |
| 4 | do | 3-methoxy-1-hydroxybenzene | Do. |
| 5 | do | 4-chloro-1-hydroxybenzene | Do. |
| 6 | [structure] | 4-methyl-1-hydroxybenzene | Do. |
| 7 | Same as No. 6 above | 4-t.butyl-1-hydroxybenzene | Do. |
| 8 | do | 4-chloro-1-hydroxybenzene | Do. |
| 9 | do | 2,5-dichloro-1-hydroxybenzene | Do. |
| 10 | do | 4-phenyl-1-hydroxybenzene | Do. |
| 11 | do | 2-phenyl-1-hydroxybenzene | Do. |
| 12 | [structure] | Hydroxybenzene | Do. |
| 13 | Same as No. 12 above | 4-chloro-1-hydroxybenzene | Do. |
| 14 | [structure] | Hydroxybenzene | Do. |
| 15 | [structure] | do | Do. |
| 16 | [structure] | do | Do. |

TABLE V—Continued

| No. | Sulphonic acid chlorides | Hydroxyaryl compound | Shade on polyester fibres |
|---|---|---|---|
| 17 | ClO₂S—⌬(NO₂)—N=N—C(—C—CH₃)=N—N(CH₂—CH₂—⌬) with H₂N—C | ...do... | Do. |
| 18 | ClO₂S—⌬(NO₂)—N=N—C(—C—CH₃)=N—N(CH₂—CH(OH)—⌬) with N₂H—C | ...do... | Do. |
| 19 | ClO₂S—⌬(NO₂)—N=N—C(—C—CH₃)=N—N(⌬—OC₂H₅) with H₂N—C | ...do... | Do. |
| 20 | ClO₂S—⌬(NO₂)—N=N—C(—C—CH₃)=N—N(⌬(H₃C)(CH₃)) with H₂N—C | ...do... | Do. |
| 21 | ClO₂S—⌬(NO₂)—N=N—C(—C—CH₃)=N—N(⌬—Cl) with H₂N—C | ...do... | Do. |

Example 7

9.6 parts of the dyestuff sulphochloride produced in Example 6 and sodium n-butylate, corresponding to 0.5 part of metalic sodium are heated for 4 hours at 70–80° in 75 parts of n-butanol. The reaction mixture is then dried in vacuo and the residue is taken up in 125 parts of dimethyl formamide. This dimethyl formamide solution is poured into 700 parts of cold water. In this way, an orange product is obtained of the formula

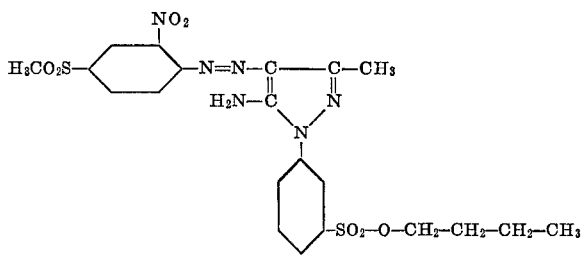

In the presence of a naphthalene sulphonic acid-formaldehyde condensation product, it dyes polyglycol terephthalate fibres such as Tergal in orange shades from an aqueous suspension, possibly in the presence of o-phenylphenol. The dyeings are fast to washing, sublimation and light.

A product having similar properties is obtained if, under the above conditions, equivalent amounts of cyclohexanol are used instead of butanol.

Example 8

3 parts of the dyestuff obtained according to Example 1 are dispersed in 4000 parts of water.

12 parts of the sodium salt of o-phenylphenol, 12 parts of diammonium phosphate are added to this dispersion and 100 parts of a polyterephthalic acid glycol ester fabric are dyes for 1½ hours at 90–95°. The dyeing is rinsed and thoroughly washed with dilute sodium hydroxide solution and a dispersing agent.

In this way, an oranged dyeing is obtained which is fast to light, washing and sublimation.

Similar good dyeings are obtained with the other dyestuffs described.

Example 9

2 parts of the dyestuff obtained according to Example 2 are finely suspended in 4000 parts of water which contains 2 parts of a fatty alcohol-polyethylene oxide condensation product. The pH of the dyebath is adjusted to 6.5 with acetic acid.

100 parts of polyester fabric are then introduced at 40°, the bath is heated within 15 minutes in an autoclave to 120° and kept for 45 minutes at this temperature. The dyeing is rinsed with water and soaped. In this way a yellow-orange is obtained which is fast to light and sublimation.

The other dyestuffs described produce similarly good dyeings.

Example 10

Polyglycol terephthalate fabric such as "Dacron" of E. I. du Pont is impregnated in a foulard at 40° with a liquor of the following composition:

20 parts of the dyestuff obtained according to Example 3, finely dispersed in
7.5 parts of sodium alginate,
20 parts of triethanolamine,
20 parts of a fatty alcohol-polyethylene oxide condensation product, and
900 parts of water.

The fabric is squeezed out to 100% content, dried at 100° and then the dyeing is fixed for 30 seconds at a temperature of 210°. The dyed goods are rinsed with water, soaped and dried. Under these conditions, an orange dyeing is obtained which is fast to washing, rubbing, light and sublimation.

The dyestuffs described in the other examples produce dyeings of equal quality according to this process.

Example 11

42 parts of the sulphonic acid chloride of the formula

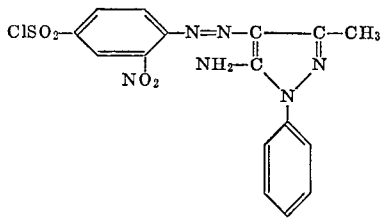

are heated for 6 hours at 70–80° with 18 parts of 3-hydroxypyridine and 18 parts of sodium carbonate in 200 parts of ethyl alcohol and 200 parts of water. The reaction mixture is then cooled and the precipitate formed is filtered off, washed with water and dried under reduced pressure at 70–80°. The resulting dyestuff is an orange brown powder and corresponds to the formula

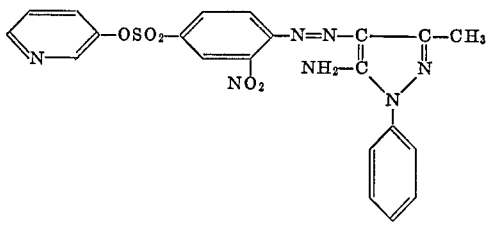

After milling with the alkali metal salts of a condensation product of naphthalene sulphonic acid and formaldehyde, the dyestuff described dyes polyethyleneglycol terephthalate fibers in pure orange shades from an aqueous dispersion, sometimes in the presence of a carrier. The dyeings have very good fastness to washing, sublimation and light.

The sulphonic acid chloride used as starting material is obtained by coupling diazotised 1-amino-2-nitrobenzene-4-sulphonic acid with 1 - phenyl-3-methyl-5-aminopyrazole and reacting the dyestuff sulphonic acid obtained with phosphorus oxychloride in chlorobenzene.

Example 12

Example 11 is repeated, but the dyestuff sulfonic chloride of the formula

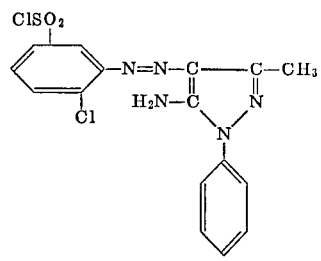

is used for the reaction with 3-hydroxypyridine instead of the sulfonic chloride used in the preceding example.

A dyestuff of similar properties as that described in the preceding example is obtained. Its formula is:

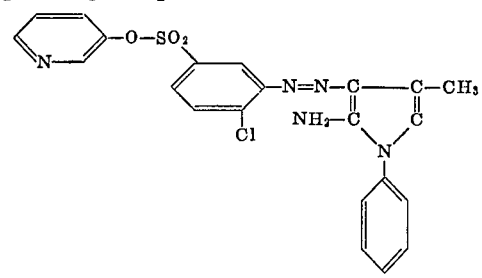

It affords dyeings on polyethylene glycol terephthalate fibers which are of orange shade and fast to washing, light and sublimation.

What is claimed is:
1. A monoazo dyestuff of the formula

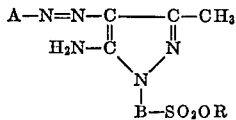

wherein A is a member selected from the group consisting of the radical of the formula

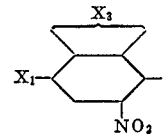

and a radical of the formula

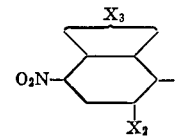

wherein $X_1$ is a member selected from the group consisting of hydrogen, chlorine, bromine, nitro, lower alkylsulfonyl, lower alkyl and lower alkoxy, $X_2$ is a member selected from the group consisting of hydrogen, chlorine, bromine, lower alkyl, lower alkoxy and cyano, $X_3$ is a member selected from the group consisting of hydrogen, chlorine, bromine and lower alkoxycarbonyl, B is a member selected from the group consisting of phenyl, lower alkyl-phenyl and chlorophenyl; and R is a member selected from the group consisting of primary alkyl with from 4 to 10 carbon atoms, secondary alkyl with from 4 to 10 carbon atoms, cyclohexyl, phenyl, lower alkylphenyl, lower alkoxyphenyl, chlorophenyl, bromophenyl, lower alkanoylaminophenyl, hydroxy-lower alkylphenyl, carbamylphenyl, sulfamyl-phenyl, N-lower alkyl-carbamylphenyl, N-lower alkylsulfamyl-phenyl, lower alkoxy carbonylphenyl, diphenyl, di-(N-lower alkyl)-aminophenyl, phenoxyphenyl, naphthyl and pyridyl-(3); said azo dyestuff being free from water-solubilizing groups which dissociate acid in water.

2. A monoazo dyestuff in accordance with claim 1 wherein the dyestuff is of the formula

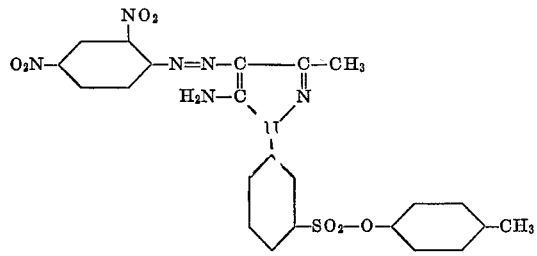

3. A monoazo dyestuff in accordance with claim 1 wherein the dyestuff is of the formula

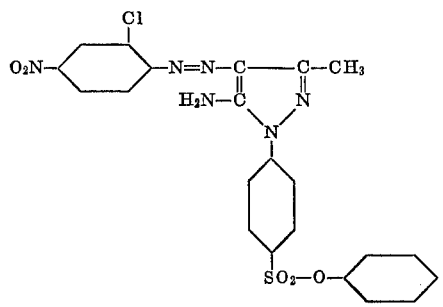

4. A monoazo dyestuff in accordance with claim 1 wherein the dyestuff is of the formula

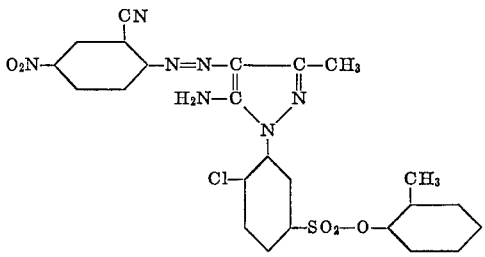

5. A monoazo dyestuff in accordance with claim 1 wherein the dyestuff is of the formula

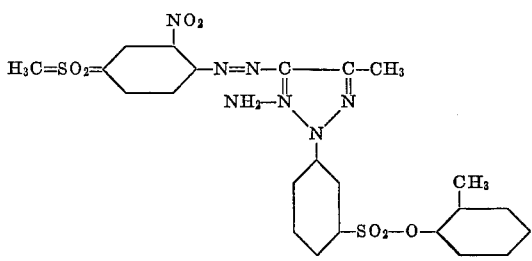

No references cited.

CHARLES B. PARKER, Primary Examiner

D. M. PAPUGA, Assistant Examiner

U.S. Cl. X.R.

8—41, 54, 55; 260—156, 310, 456